AUTOMATIC AGGLUTINOMETER

Filed Feb. 23, 1966 3 Sheets-Sheet 1

INVENTORS
DOROTHY I. GOOD
ROSE M. MORGAN
BY Merchant & Gould
ATTORNEYS

AUTOMATIC AGGLUTINOMETER
Filed Feb. 23, 1966 3 Sheets-Sheet 2
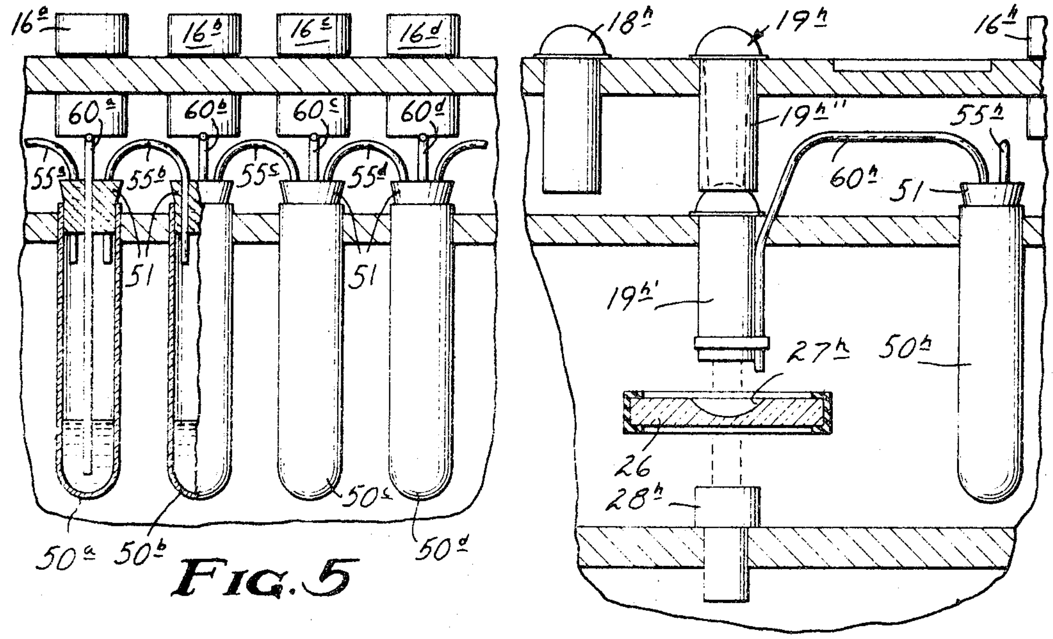
FIG. 5
FIG. 6
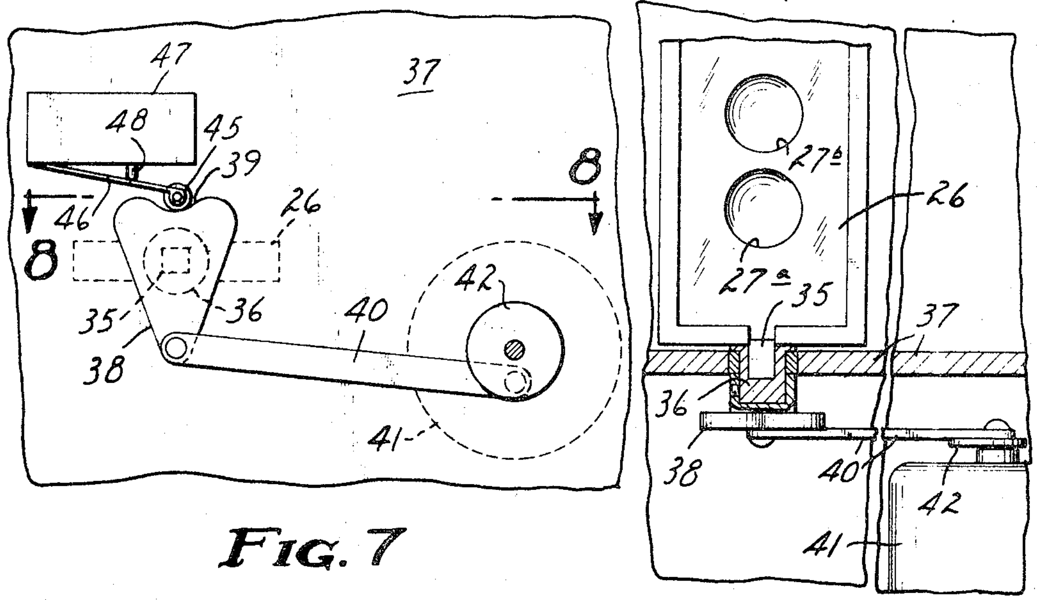
FIG. 7
FIG. 8
INVENTORS
DOROTHY I. GOOD
ROSE M. MORGAN
BY Merchant & Gould
ATTORNEYS

AUTOMATIC AGGLUTINOMETER

Filed Feb. 23, 1966 3 Sheets-Sheet 3

INVENTORS
DOROTHY I. GOOD
ROSE M. MORGAN
BY Merchant & Gould
ATTORNEYS

United States Patent Office 3,488,156
Patented Jan. 6, 1970

3,488,156

AUTOMATIC AGGLUTINOMETER

Dorothy I. Good and Rose M. Morgan, Fargo, N. Dak., assignors to Lab-Line Biomedical Products, Inc., Melrose Park, Ill., a corporation of Illinois Filed Feb. 23, 1966, Ser. No. 529,435
Int. Cl. G01n *33/16;* C12k *1/00*
U.S. Cl. 23—253 6 Claims

ABSTRACT OF THE DISCLOSURE

A rocker-mounted tray having a plurality of cups therein, each adapted to receive a culture suspension containing material to be tested, a motor eccentrically attached thereto for rocking the tray to thoroughly agitate any mixture within the cups, a plurality of reservoirs containing a variety of antigens and connected through conduits to a pump means and to the cups so that upon actuation of the pump means a predetermined amount of antigen is dispensed in each of the cups, and electrical circuitry for energizing the pump means and the rocking motor at a predetermined time and for a predetermined length of time to produce agglutination in certain of the cups if certain antibodies are present. The apparatus further contains light sources and photocells for each of the cups connected to electronic circuitry variable to set the threshold of the photocells prior to agitation of the cups and for measuring the light transmitted through the cups after agitation to determine whether agglutination has occurred.

This invention pertains to apparatus which automatically tests for agglutination and more specifically to apparatus in which a plurality of tests for antibodies of the type which cause agglutination utilizing a variety of antigens can be made sequentially and automatically.

In the field of medicine various antibodies are noted for their ability to cause agglutination and in many tests it is of prime importance to determine whether such antibodies are present. Examples of such antibodies are bacterial antibodies, pregnancy tests based on antibody reactions, syphilitic antibodies, etc. In testing for the presence of these various antibodies a culture suspension containing the material to be tested is produced and samples of this suspension are mixed with various antigens one at a time. By determining which antigens cause agglutination in the suspension the various antibodies in the suspension can be identified. This entire process can be quite laborious, especially if the culture suspension is to be tested with a great variety of antigens. The testing is especially time consuming since each time an antigen is mixed with a sample of the culture suspension the mixture must be agitated for a relatively long period of time (several minutes) before the reaction takes place.

In the present device all of the preparation and inspection for the various tests is accomplished automatically. A tray is provided having a plurality of containers therein each of which is adapted to receive a sample of the culture suspension. The present device also has a plurality of reservoirs containing a variety of different antigens. Each of these reservoirs is adapted to have pressure applied thereto by a pumping system which, when activated, causes some of the antigen to flow into one of the containers containing the culture suspension. The present device may also be provided with a single reservoir with only one antigen therein. Each of the containers in the tray would then have placed therein samples of a variety of culture suspensions. In the following description a plurality of antigens will be utilized since the mechanism is more complicated and once understood, the simpler mechanism will also be understood.

The tray having all of the containers fixedly attached therein is then agitated, by rocking or the like, for a preset period of time. After the desired amount of agitation has taken place the material in each of the containers is inspected for agglutination. This inspection is accomplished by means of light sources, light sensitive devices and an electronic circuit which compares the amount of light passing through the container and the material therein after agitation to the amount before agitation. Indicating apparatus located somewhere on the device receives a signal from the electronic circuit for each test and indicates whether agglutination took place in any of the containers.

Since the automatic agglutinometer agitates all of the samples simultaneously and inspects them sequentially thereafter, within a very short period, the total elapsed time required to perform the entire plurality of tests is only slightly longer than the time required to perform one test by hand. Thus, the present device greatly reduces the amount of time required to test the culture suspension with all of the variety of antigens. Also, there is less possibility of error in the present device since each specific antigen is clearly marked beside the various indicating devices and the danger of an operator forgetting which specific antigen is being utilized in a particular test is eliminated.

It is an object of the present invention to provide a new and improved automatic agglutinometer.

It is a further object of the present invention to provide an automatic agglutinometer for serologically identifying any and all antibodies of the types which cause agglutination.

These and other objects of this invention will become apparent to those skilled in the art upon consideration of the accompanying specification, claims and drawings.

Referring to the drawings, wherein like characters indicate like parts throughout the figures:

FIG. 2 is a top view of the apparatus illustrated in FIG. 1, parts thereof broken away and shown in section;

FIG. 5 is an enlarged sectional view as seen from the line 5—5 in FIG. 3;

FIG. 6 is an enlarged sectional view as seen from the line 6—6 in FIG. 3;

FIG. 7 is an enlarged sectional view as seen from the line 7—7 in FIG. 2;

FIG. 8 is a sectional view as seen from the line 8—8 in FIG. 7; and

Figure 1:
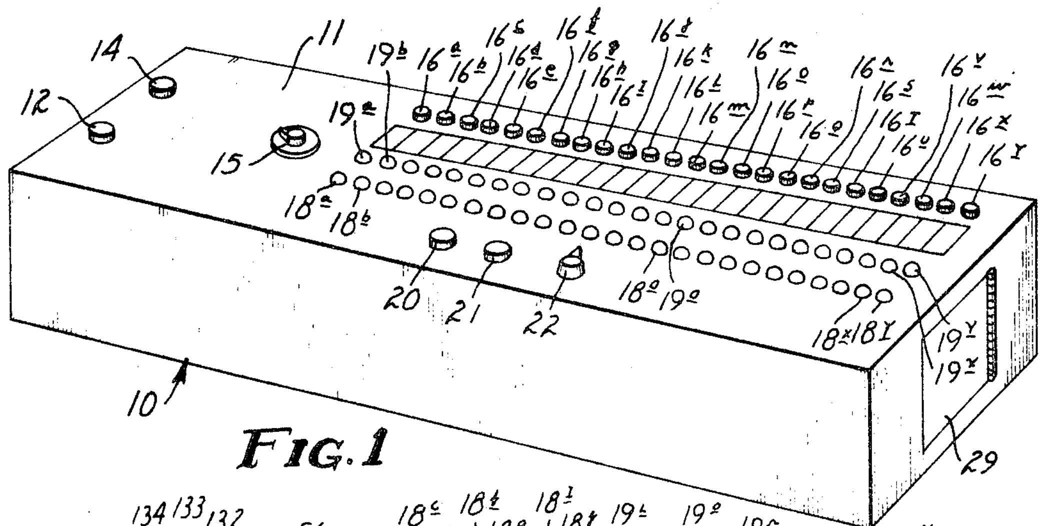
FIG. 1 is a view in perspective of the present apparatus.
Figure 2:
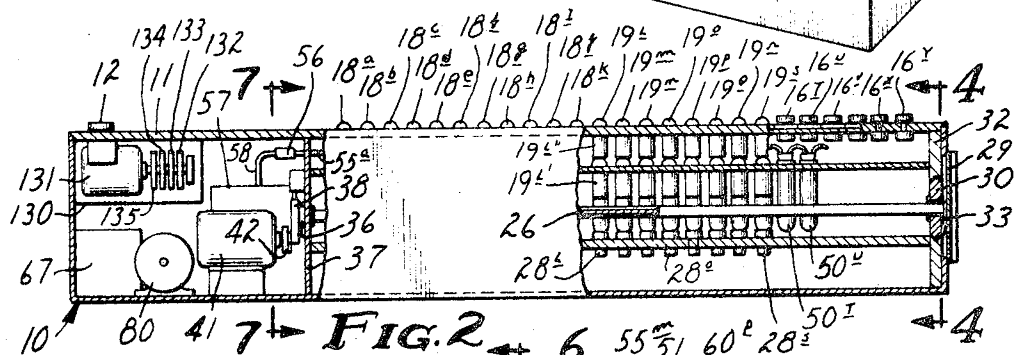
FIG. 2 is a side view of the apparatus illustrated in FIG. 1, parts thereof broken away and shown in section.
Figure 3:
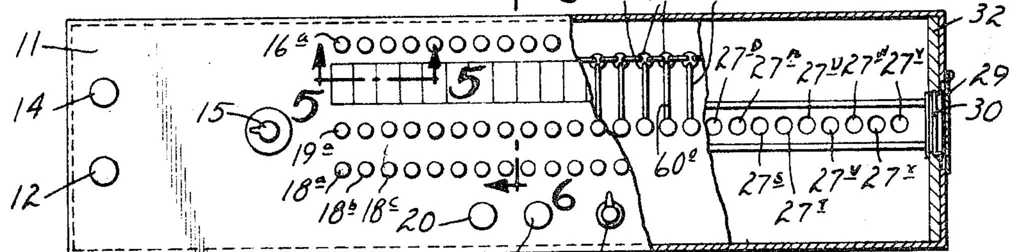
Figure 4:
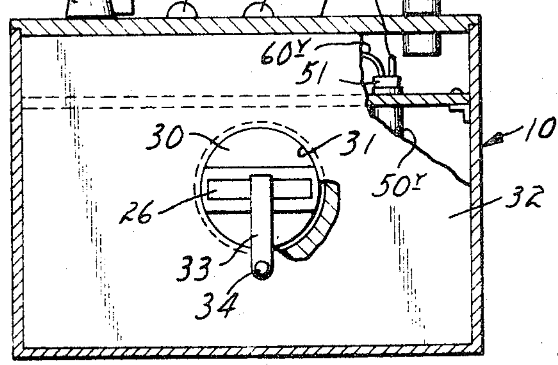
FIG. 4 is an enlarged sectional view as seen from the line 4—4 in FIG. 2, parts thereof broken away and shown in section.

In the figures, the numeral 10 generally designates a rectangular shaped housing containing the automatic agglutinometer components and having a control panel 11 at the top thereof. The upper end of the control panel 11, or the left end in FIG. 1, has a push button on/off switch 12 of the type which once pushed remains on until pushed again. The push button on/off switch 12 also has a pilot lamp 13, illustrated schematically in FIG. 9, associated therewith so as to light the push button 12 when the apparatus is turned on. At the same end of the control panel 11 is a completion lamp 14 which lights when the entire testing operation is completed. Somewhat below the on/off switch 12 and completion lamp 14 is a timer control dial 15. Below the timer control dial 15 and extending longitudinally in a line parallel with the right side of the control panel 11 are 25 threshold control knobs 16*a–y*. Immediately to the left of each of the control knobs 16*a–y* is a rectangular slot containing a name card. Immediately to the left of each of the name card slots is an inspection lamp 19*a–y* and an indicator lamp 18*a–y* is located immediately to the left of each of the inspection lamps 19*a–y*. Referring to FIG. 6 the inspection lamps 19*a–y* include a light source, not shown, inside of a tubular housing 19*h'* which transmits light upwardly and downwardly along the axis of the housing 19*h'*. The light transmited upwardly is apparent at the control panel 11 through a hollow tubular member 19*h''* which is mounted in the control panel 11 coaxial with the housing 19*h'*. Along the left edge of the control panel 11 and approximately centrally located is an innoculation push button 20 with a second push button 21 utilized to clear, or turn off, the indicator lamps 18*a–y* immediately therebelow. A three position, advance-and-run switch, 22 is located immediately below the push button switch 21.

In the FIGS. 2–8 the numeral 26 designates an elongated tray having 25 transparent containers 27*a–y* fixedly attached therein along a line parallel with and immediately below the inspection lamps 19*a–y*. The tray 26 has an opening completely therethrough in which each of the containers 27*a–y* is mounted so that light from each of the inspection lights 19*a–y* (the lower end of each of the housings 19') may pass downwardly through the respective containers 27*a–y*. Each of the containers 27*a–y* has a light sensitive device, such as the photocells 28*a–y* utilized in the present embodiment, located immediately therebelow so that light passing through the containers 27*a–y* impinges upon the associated photocells 28*a–y*. The lower end of the housing 10, which in FIG. 1 is the right end, has a small access door 29 hingedly attached therein for insertion and removal of the tray 26. When the tray 26 is correctly positioned the end immediately adjacent the door fits into a matching slot in a circular shaped bearing 30. The bearing 30 is rotatably mounted in a matching opening 31 in a partition 32 immediately adjacent and substantially parallel with the door 29. A rotatably mounted spring clip 33 is free to rotate about its mounting 34 and when the clip 33 is in the vertical position it holds the tray 26 fixedly in the correct position. To insert or remove the tray 26 the spring clip 33 is simply rotated to a substantially horizontal position about its mounting 34.

The opposite end of the tray 26 has a tongue 35 extending longitudinally therefrom with a substantially rectangular shaped cross-section. The tongue 35 fits into a mating slot in one end of a cylindrical shaft 36. The shaft 36 is rotatably mounted in a partition 37 which is situated parallel to the partition 32 and spaced therefrom. The free end of the shaft 36 has a substantially heart shaped cam 38 fixedly attached thereto for rotation therewith. The cam 38 has a notch 39 therein which is positioned directly above the axis of rotation of the cam 38 when the tray 26 is horizontal. One end of a link 40 is rotatably attached to the lower end or tip of the cam 38 and the other end is rotatably attached eccentrically to a motor 41 by a crank 42. Thus, when the motor 41 is actuated any material in the containers 27*a–y* is agitated by a rocking motion of the tray 26.

A cam follower 45 is rotatably attached to an actuating arm 46 of limit switch 47. The limit switch 47 is of the type in which a button 48 closes a pair of contacts when it is moved inwardly a fraction of an inch. The switch 47 is mounted on the partition 37 so that the cam follower 45 is positioned in the notch 39 of the cam 38 when the tray 26 is horizontal. In addition, the switch 47 is positioned so that the button 48 is out, or the contacts are open, when the tray 26 is horizontal and closed at any other time. The electrical connections of the motor 41 and the switch 47 will be discussed in more detail in conjunction with the schematic drawing of FIG. 9.

Associated with each of the contaners 27*a–y* is a vial or bottle 50*a–y*. Each of the vials 50*a–y* are mounted to the right and somewhat above each of the associated containers 27*a–y*. Each of the vials 50*a–y* has a removable stopper 51 therein which has three openings therethrough, except for the stopper 51 in the vial 50*y* which only has two openings therethrough. Each of the vials 50*a–y* are adapted to have placed therein approximately equal amounts of various antigens which are to be utilized in the testing procedure. The name or title of the antigen in each of the vials 50*a–y* is written on a card which is placed in the slot associated with that particular vial 50*a–y* on the control panel 11. The vial 50*a* has one end of a length of tubing 55*a* inserted into one of the openings in the stopper 51. The other end of the tubing 55*a* is attached to an air pressure switch 56, illustrated schematically in FIG. 9. The air pressure switch 56 is in turn attached to an air pressure reservoir 57 through a piece of tubing 58. One end of a second piece of tubing 55*b*, which is tubing similar to 55*a*, extends into the vial 50*a* through a second opening in the stopper 51 while the other end extends into the vial 50*b* through a first opening in its stopper 51. Each of the vials 50*a–y* are connected to the next adjacent vial in a similar manner by pieces of flexible tubing 55*b–y*. One end of a length of tubing 60*a*, which preferably is a special nonwetting type Teflon or the like wherein no capulary actions take place, extends into the vial 50*a* well below the antigen therein through the third opening in the stopper 51. The free end of the tubing 60*a* extends to a point directly over the associated container 27*a*. Thus, when air pressure is applied to the tubing 55*a* antigen is forced out of the vial 50*a* through the tubing 60*a* and into the contaner 27*a*. In a like manner each of the vials 50*b–y* have one end of a tubing 60*b–y* extending thereinto through a hole in the inserted stopper 51 with the free end terminating above the associated container 27*b–y*, respectively.

Figure 9:
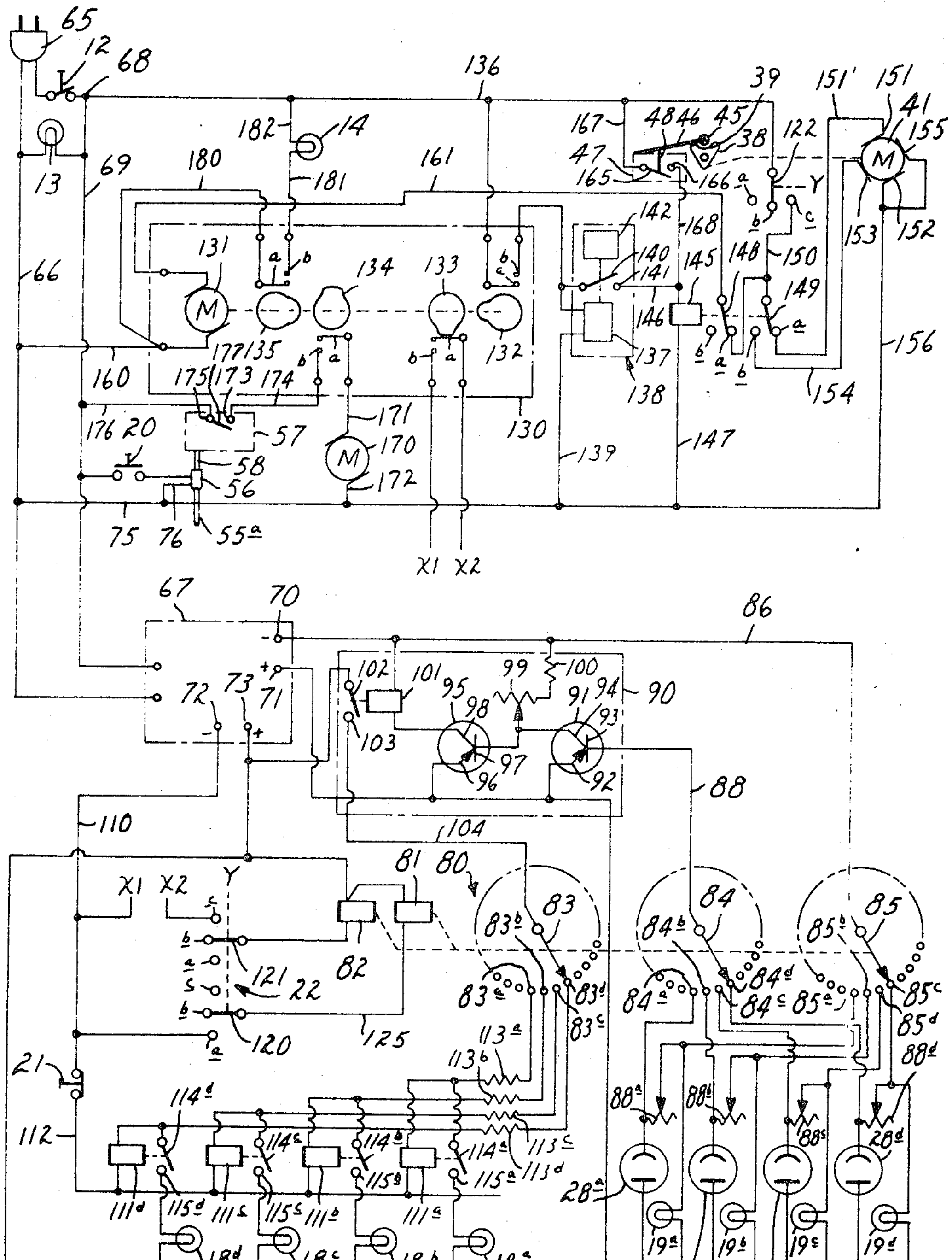
FIG. 9 is a schematic illustration of the electrical circuitry in the present apparatus.

Referring to FIG. 9 for the electrical connections of the automatic agglutinometer, in the upper left corner of a plug 65 is adapted to be connected to a suitable source of power, such as the standard 115 volts, 60 cycle. One end of a lead 66 is connected to one of the terminals of the plug 65 and the other end is connected to an input terminal of a power supply 67. The second terminal of the plug 65 is connected to one terminal of the on/off push button switch 12 and the other terminal of the switch 12 is connected to a junction 68. The junction 68 is connected to the other input terminal of the power supply 67 by a lead 69. Thus, when the push button switch 12 is closed power is supplied to the input terminals of the power supply 67. The power supply 67 has a —12 volt output terminal 70 and an associated plus or ground terminal 71. The power supply 67 also has a —24 volt output terminal 72 and an associated plus or ground terminal 73.

The air pressure switch 56 which is connected to the air pressure reservoir 57 by the tubing 58 is connected to a lead 75, one end of which is in turn connected to the lead 66, by a lead 76. A second terminal of the pressure switch 56 is connected to one of the contacts of the push button switch 20 and the other contact of the push button switch 20 is connected to the lead 69. Thus, assuming the air pressure reservoir 57 has sufficient air pressure therein and the on/off switch 12 is on, when the push button switch 20 is depressed the air pressure switch 56 is activated and the air pressure of the reservoir 57 is applied to the vials 50*a–y* by means of the tubing 55*a–y*. When air pressure is applied to the vials 50*a–y* antigen from each of the vials is forced out of the tubing 60*a–y* and into the associated containers 27*a–y*.

A stepping switch generally designated 80 has a first coil 81, a second coil 82 and three movable contacts 83, 84 and 85, each of which has 25 stationary contacts or steps *a–y* associated therewith and an original or normal position having no connections thereto. The first coil 81 moves each of the moving contacts 83, 84 and 85 one step each time it is energized and the second coil 82 is self-pulsing so that each of the movable contacts 83, 84 and 85 move from the normal position through all 25 of the stationary contacts *a–y* each time the coil 82 is energized. One end of a lead 86 is connected to the output terminal 70 of the power supply 67 and the other end is connected to the movable contact 85 of the stepping switch 80. One end of a ground lead 87 is connected to the output terminal 71 of the power supply 67. The anode of each of the photocells 28*a–y* is connected to the ground line 87 and the cathode of each of the photocells 28*a–y* is connected to a contact 84*a–y*, respectively, of the stepping switch 80. Twenty-five threshold adjustments consist of variable resistors 88*a–y* each having a resistive element and an adjustable tap with one of the knobs 16*a–y*, respectively, on the control panel 11 attached thereto. A corresponding end of each of the resistive elements of the variable resistors 88*a–y* is connected to the corresponding cathode of one of the photocells 28*a–y*. The adjustable tap of each of the variable resistors 88*a–y* is connected to a corresponding stationary contact 85*a–y* of the stepping switch 80. One side of each of the inspection lamps 19*a–y* is connected to a corresponding stationary contact 85*a–y*, respectively, and the other side of each of the inspection lamps 19*a–y* is connected to the ground lead 87. One end of a lead 88 is connected to the movable contact 84 of the stepping switch 80 and the other end is connected to the input of an electronic circuit 90.

The electronic circuit 90 is an amplifier-relay circuit which receives the signals from the photocells 28*a–y* and differentiates between photocells associated with containers in which agglutination has not taken place and photocells associated with containers in which agglutination has taken place. The electronic circuit 90 contains a first transistor 91 having an emitter 92, a base 93 and a collector 94 and a second transistor 95 having an emitter 96, a base 97 and a collector 98. The base 93 of the first transistor 91 acts as the input to the electronic circuit 90 and has the lead 88 connected thereto. The emitter 92 of the transistor 91 is connected to the ground lead 87. The collector 94 of the transistor 91 is connected to the base 97 of the transistor 95. The collector 94 of the transistor 91 is also connected to a movable contact of a variable resistor 99. One end of the resistive element of the variable resistor 99 is connected to one end of a fixed resistor 100 and the other end of the fixed resistor 100 is connected to the lead 86. The emitter 96 of the transistor 95 is connected to the ground lead 87. The collector 98 of the transistor 95 is connected to one terminal of a relay coil 101. The other terminal of the relay coil 101 is connected to the lead 86. The relay coil 101 has a movable contact 102 and a stationary contact 103 associated therewith which contacts 102 and 103 close to complete a circuit when the relay coil 101 is energized. The movable contact 102 is connected to the output terminal 73 of the power supply 67 and the stationary contact 103 is connected to the movable contact 83 of the stepping switch 80 by a lead 104.

One contact of the push button 21, utilized to clear the indicator lamps 18*a–y*, is connected to the negative 24 volt terminal 72 of the power supply 67 by a lead 110. The other contact of the push button switch 21 is connected to one side of each of 25 relays 111*a–y* by a lead 112. The other side of each of the relay 111*a–y* is connected through a corresponding fixed resistor 113*a–y* to the contacts 83*a–y*, respectively, of the stepping switch 80. Each of the relay coils 111*a–y* has associated therewith a corresponding movable contact 114*a–y* and a corresponding stationary contact 115*a–y*. The movable contacts 114*a–y* are connected to their associated coils 111*a–y* on the side which also has the resistor 113*a–y* attached thereto. The stationary contacts 115*a–y* are connected to one side of the corresponding indicator lamps 18*a–y* and the other side of each of the indicator lamps 18*a–y* are connected to the positive 24 volt terminal 73 of the power supply 67 by a lead 116.

Thus, when the movable contacts 83, 84 and 85 of the stepping switch 80 are positioned at the stationary contacts, for example 83*d*, 84*d* and 85*d* as illustrated in FIG. 9, and light from the inspection lamp 19*d* impinges upon the photocell 28*d*, a signal is applied to the input, or base 93, of the electronic circuit 90 which causes transistors 91 and 95 to conduct energizing the relay coil 101 and closing the contacts 102 and 103 associated therewith. The closing of the contacts 102 and 103 completes a circuit through the movable contact 83 and the stationary contact 83*d* to the relay coil 111*d* and through the push button switch 21 back to the terminal 72 of the power supply 67. The energization of the relay coil 111*d* causes contacts 114*d* and 115*d* to close completing a circuit from the terminal 73 of power supply 67 through the lead 116, indicator lamp 18*d*, contacts 115*d* and 114*d*, relay 111*d* and push button switch 21 to the terminal 72. Thus, the indicator lamp 18*d* remains energized until the push button switch 21 is depressed breaking the energization circuit to the relay coil 111*d* and allowing the contacts 114*d* and 115*d* to open. Similar circuits can be traced for each of the photocells 28*a–y* and indicator lamps 18*a–y*.

The three position advance-and-run switch 22 has three movable contacts 120, 121, and 122 attached thereto each of which has associated therewith three stationary contacts designated *a*, *b* and *c*. The switch 22 is of the type in which the movable contacts 120, 121 and 122 are normally in engagement with the center stationary contact *b* and may be moved into engagement with either of the contacts *a* or *c* but will immediately return to engagement with the contact *b* when released. The movable contact 120 is connected to one side of the first coil 81 of the stepping switch 80 by a lead 125. The stationary contact *a* associated with the movable contact 120 is connected to the lead 110 and the stationary contacts *b* and *c* do not have connections thereto. The other terminal of the coil 81 is attached to one terminal of the coil 82, which is also attached to the lead 116 and, thus, the terminal 73 of the power supply 67. The other terminal of the coil 82 is connected to the movable contact 121 of the switch 22. The contacts *a* and *b* associated with the movable contact 121 do not have any connections thereto and the stationary contact *c* is connected to a terminal designated $X_2$. A second terminal $X_1$ is connected to the line 110. The terminals $X_1$ and $X_2$ are connected to similar terminals designated $X_1$ and $X_2$ in the upper portion of FIG. 9 and will be explained in conjunction with the remainder of the circuit. Terminals $X_1$ and $X_2$ are utilized to simplify the circuitry in FIG. 9.

A programmer 130 includes an electric motor 131 adapted to have applied thereto a suitable source of power, such as 115 volts 60 cycle and four cams 131–135 attached to the shaft of the motor 131 for rotation therewith. Each of the cams 132–135 have a movable contact designated *a* and a stationary contact designated *b* associated therewith. The cams 132–135 are adjustable on the shaft of the motor 131 and are positioned so that the contacts *a* and *b* associated with the cam 132 close for a specified period of time and open after which the contacts *a* and *b* associated with the cams 133, 134 and 135 close for a specified period of time and open sequentially in the order specified. The contact *a* associated with the cam 132 is connected to the junction 68 by a lead 136. The contact *b* associated with the cam 132 is connected to one terminal of a coil 137 in a timer generally designated 138. The other terminal of the coil 137 is connected to the lead 75 by a lead 139. Associated with the coil 137 in the timer 138 is a movable contact 140 and a stationary contact 141. When the coil 137 is energized the movable contact 140 engages the stationary contact 141 and closes the circuit therebetween. The movable contact 140 also has associated therewith a timing circuit 142 which begins operation upon the energization of the coil 137 and disengages the movable contact 140 from the stationary contact 141 after a specified period of time, which period of time is determined by the setting of the timer control dial 15 on the control panel 11. The timing circuit 142 disengages the movable contact 140 from the stationary contact 141 after the specified time even though the coil 137 is still energized. Thus, assuming a period of time is set in the timing circuit 142 by the timer control dial 15, when the cam 132 closes the associated contacts *a* and *b* the coil 137 is energized and movable contact 140 engages fixed contact 141 for the specified period of time.

One side of a relay coil 145 is connected to the stationary contact 141 of timer 138 by a lead 146. The other side of the relay coil 145 is connected to the lead 75 by a lead 147. Associated with the relay coil 145 are two movable contacts 148 and 149 each having two stationary contacts *a* and *b* associated therewith. The movable contacts 148 and 149 are normally in engagement with the stationary contacts *a* and move into engagement with the contacts *b* when the relay coil 45 is energized.

The movable contact 122 of the advance-and-run switch 22 is connected to the terminal 68 by a lead 136. The stationary contact *c* associated with the movable contact 122 is connected to the stationary contact *a* associated with the movable contact 148 and to the movable contact 149 by a lead 150. The stationary contacts *a* and *b* associated with the movable contact 122 do not have connections thereto. The stationary contact *b* associated with the movable contact 148 does not have a connection thereto. The stationary contact *a* associated with the movable contact 149 is connected to a terminal 151 of the motor 41 by a lead 151'. The terminal 151 along with a terminal 152 on the motor 41 are internally attached to an electrical brake, which when energized prevents the motor 41 from rotating. The stationary contact *b* associated with the movable contact 149 is connected to a terminal 153 on the motor 41 by a lead 154. The terminal 153 along with a second terminal 155 of the motor 41 are internally connected to windings of the motor 41, which when energized cause the motor 41 to rotate. The terminals 152 and 155 are connected to the lead 75 by a lead 156.

One side of the motor 131 in the programer 130 is connected to the lead 66 by a lead 160. The other side of the motor 131 is connected to the movable contact 148 by a lead 161. Thus, when the advance-run switch 22 is moved to position *c* and the on/off switch 12 is on, the movable contact 122 completes a circuit for the motor 131 which begins to rotate the cams 132–135. When the cam 132 moves the movable contact *a* into engagement with the stationary contact *b* associated therewith a circuit is completed energizing the coil 137 which causes the movable contact 140 to engage the stationary contact 141, which in turn energizes the coil 145. When the coil 145 is energized the movable contacts 148 and 149 move into engagement with the stationary contacts *b* associated therewith. Moving the movable contact 148 from engagement with the stationary contact *a* removes power from the motor 131 and moving the movable contact 149 from engagement with the stationary contact *a* into engagement with the stationary contact *b* removes the energization from the brake (terminals 151 and 152) of the motor 41 and energizes the coils which cause it to rotate (terminals 153 and 155). Thus, the motor 41 rotates causing the tray 26 to rock and agitate the material in the containers 27*a–y*.

The switch 47, which is actuated by the cam follower 45, has a movable contact 165 and a stationary contact 166. The movable contact 165 is connected to the lead 136 by a lead 167 and the stationary contact 166 is connected to the stationary contact 141 of the timer 138 by a lead 168. When the period of time set into the timing device 142 at the timer control dial 15 has terminated the movable contact 140 is disengaged from the stationary contact 141, thereby, breaking the circuit to the coil 145. However, assuming the tray 26 is not horizontal at that precise period of time the cam follower 45 will be on one of the upwardly extended corners of the cam 38 and the contacts 165 and 166 of the switch 47 will be in engagement. Thus, a circuit is completed to the coil 145 through the switch 147 and the coil 145 remains energized until the cam follower 45 drops into the notch 39 in the cam 38 at which time the movable contact 165 is disengaged from the stationary contact 166. When the tray 26 is horizontal and the switch 47 is open the coil 145 is deenergized and the movable contacts 148 and 149 are allowed to return to engagement with the stationary contacts *a* associated therewith. Thus, a circuit is completed to the programer motor 131 and the electrical brake on the motor 41 is energized.

In the operation of the present device, the tray 26 is removed through the door 29 and a small sample, for example a drop or two, of a culture suspension desired to be tested is placed in each of the containers 27*a–y*. The tray 26 is then replaced in the housing 10 and the innoculation push button 20 is depressed, which actuates the pressure switch 56 applying pressure from the reservoir 57 to each of the vials 50*a–y* by way of the tubing 55*a–y*. The pressure applied ot the vials 50*a–y* by causes a small quantity of the antigen in each of the vials to be supplied to the containers 27*a–y*, respectively, through the tubing 60*a–y*. After the sample of suspension and the antigen are in the containers 27*a–y* and before the material is agitated, the advance-run switch 22 is moved to the advance position in which the movable contacts 120, 121, and 122 are moved into engagement with the stationary contacts *a* associated therewith. This supplies power to the coil 81 of the stepping switch 80 and causes the movable contacts 83, 84 and 85 to move to the positions 83*a*, 84*a*, and 85*a*, respectively. The variable resistor 88*a* is adjusted to a threshold position by means of control knob 16*a*. The threshold position is the point at which the light from the inspection lamps 19*a* passing through the container 27*a* and the material therein is sufficient to produce conduction in the photocell 28*a*, transistor 91, transistor 95 and energization of the relay coil 101. At the threshold position any agglutination in the container 27*a* will reduce the light striking the photocell 28*a* sufficiently to lower conduction of the photocell 28*a* to a point at which the transistors 91 and 95 will not conduct adequately to energize the relay coil 101. When the threshold control knob 16*a* and associated variable resistor 88*a* are positioned correctly the relay coil 101 is energized and a circuit is completed through the movable contact 83 to the stationary contact 83*a* which energizes the relay coil 111*a* closing associated contacts 114*a* and 115*a* and supplying power to the indicator lamp 18*a*. Since the contacts 114*a* and 115*a* also complete a circuit through the relay 111*a* the indicator lamp 18*a* remains energized even after the movable contact 83 is disengaged from the stationary contact 83*a*.

After the threshold for the photocell 28*a* is set the advance-run switch 22, which has returned to position *b*, is again depressed so that the movable contacts 120, 121 and 122 are engaged with the stationary contacts *a*. Thus, the coil 81 is energized and the movable contacts 83, 84 and 85 of the stepping switch 80 move to the stationary contacts 83*b*, 84*b* and 85*b*. The threshold control knob 16*b* and associated variable resistor 88*b* are then adjusted to the correct threshold position for the photocell 28*b*. This procedure is continued until the thresholds are adjusted for each of the photocells 28*a–y*. After the sequence has been completed the button 21 is depressed and the circuit to all of the lamps 18*a–y* and the relay coils 111*a–y* is broken so that the indicator lamps 18*a–y* are de-energized. It should be understood that, while the present embodiment contains manual threshold adjustments 16*a–y*, the entire threshold settings might be completely automatic. One device for accomplishing this would be to incorporate two sets of containers 27*a–y*, two sets of inspection lamps 19*a–y* and two sets of photocells 28*a–y*. A comparison signal could be obtained of the amount of light passing through the antigens before and after the sample is added or before and after agitation. This comparison signal could then by applied to electronic comparison networks, such as bridge circuits, and the output signal amplified and used to energize indicating means, such as lamps 18*a–y*.

In many instances a highly titered sample may be utilized in one or all of the containers 27*a–y* and a reaction between the sample and particular antigens may take place before agitation. In premature reactions such as this the threshold setting will be erroneous. To compensate for such errors the sample may be added after the antigen is added and the threshold is set. In general the sample will only change the light conducting characteristics of the container 27*a–y* and antigen only slightly. To add the sample after the antigen has been introduced into the containers *a–y* and the threshold set can be accomplished in several ways, for example by removing the tray 26, by providing openings in the top of the housing 10 which are in communication with the containers 27*a–y*, or by providing double containers in place of containers 27*a–y* which double containers have a trough connecting the two so that antigen in one container and sample in another will remain separated until the agitation cycle. If the method of removing the tray 26 is utilized the push button 21 can be made automatic by positioning the push button 21 where the tray 26 will depress it when it is correctly positioned or so the access door 29 will cause it to switch when opened, thus clearing the indicator lights 18*a–y*.

The timer control dial 15 on the control panel 11 is now set to a period of time which is desired to agitate the material in the containers 27*a–y*. The advance run switch 22 is then moved to the run position. In the run position the associated movable contacts 120, 121 and 122 are engaged with the stationary contacts *c* and energization is supplied to the programer motor 131, as previously described. The programer motor 131 rotates the cams 132–135 until the cam 132 causes the contact *a* to engage the contact *b* associated therewith. At that time the circuit to the programer motor 131 is interrupted and the motor 41 begins to rotate as previously described. The motor 41 rocks the tray 26 for the desired period of time after which the switch 47 completes a circuit to the motor 41 until the tray 26 is horizontal. At this time the switch 47 opens and the electrical brake of the motor 41 is energized stopping rotation and the programer motor 131 is again energized causing rotation of the cams 132–135.

After a specified period of time the cam 133 causes the associated movable contact *a* to engage the stationary contact *b* completing a circuit between the terminals $X_1$ and $X_2$. This completes a circuit to the self-pulsing coil 82 of the stepping switch 80 which causes the stepping switch 80 to sequentially step through each of the steps from *a–y*. As the stepping switch 80 moves through the various steps from *a–y* and the inspection lamps 19*a–y* are energized supplying light to the photocells 28*a–y* through the containers 27*a–y*. In each of the steps *a–y* the amount of light striking the photocell 28*a–y* is dependent upon whether agglutination has taken place in the container 27*a–y* being inspected. If agglutination has not taken place sufficient light strikes the photocell 28*a–y* to energize the relay 101 and complete a circuit to the indicator lamp 18*a–y*. If agglutination has taken place the light striking the particular photocell 28*a–y* is diminished sufficiently so that the coil 101 is not energized and the circuit is not completed to the particular indicator lamp 18*a–y*. It should be understood that the described circuit can easily be modified by one skilled in the art to cause the indicator lamps 18*a–y* to light if agglutination occurs in the associated container 27*a–y* and to remain out if no agglutination has occurred. It should be noted that the cam 133 is constructed so that the associated contacts *a* and *b* remain in engagement until the stepping switch 80 has passed through a complete cycle, or all 25 steps from *a–y*.

After the cam 133 has turned far enough to allow the associated contacts *a* and *b* to be disengaged the cam 134 causes the associated contact *a* to engage the contact *b*. The contact *a* associated with the cam 134 is connected to one side of a pump motor 170 by a lead 171. The other side of the pump motor 170 is connected to the lead 75 by a lead 172. The contact *b* associated with the cam 134 is connected to a terminal 173 in the air pressure reservoir 57 by a lead 174. A second terminal 175 in the air pressure reservoir 57 is connected to the lead 69 by a lead 176. A pressure sensitive switch 177 is connected to the terminals 173 and 175 within the air pressure reservoir 57. The pressure sensitive switch 177 is of the type which is normally closed and opens when the air pressure within the reservoir 57 reaches a specified value. Thus, when the cam 134 engages the associated contacts *a* and *b* a circuit is completed to the motor 170 which causes the air pressure in the reservoir 57 to raise until the switch 177 opens at which time the circuit 170 is interrupted. The cam 134 is constructed so that the contacts *a* and *b* associated therewith remain engaged for a sufficient length of time to allow the air pressure in the reservoir 57 to raise to the desired value. Thus, the air pressure in the reservoir 57 is ready for the next cycle of operation.

After the cam 134 rotates far enough for the associated contacts *a* and *b* to become disengaged the cam 135 causes the associated contact *a* to engage the contact *b*. The contact *a* associated with the cam 135 is connected to the lead 160 by a lead 180. The contact *b* associated with the cam 135 is connected to one side of the completion lamp 14 by a lead 181. The other side of the completion lamp 14 is connected to the lead 136 by a lead 182. Thus, when the cam 135 causes the associated contacts *a* and *b* to be engaged a circuit is completed energizing the completion lamp 14. The advance run switch 22 may then be return to the normal or *b* position.

Thus, a plurality of samples of the culture suspension are tested for agglutination automatically with a plurality of antigens in a period of a few minutes. The time required to complete the entire plurality of tests is only slightly longer than the time normally required for an operator to perform one test by hand. It should be understood that while the present device was explained with apparatus to complete 25 different tests in each cycle, apparatus might be constructed having more or less tests available therein. Once the operating cycle explained above is completed the operator need only note down the name of the antigen in the card slot beside each of the indicator lamps 18*a–y* which are not energized. The indicator lamps 18*a–y* on the control panel 11 which are not energized indicate the various tests in which agglutination occurred.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What is claimed is:

1. An automatic agglutinometer comprising:

(a) a plurality of transparent containers each adapted to receive a sample of a material to be tested;

(b) pump means including at least one reservoir adapted to contain an antigen and conduits operatively connected between said pump means, said reservoir and said containers for supplying a small quantity of the antigen to each of said containers upon actuation of said pump means;

(c) light means mounted adjacent said containers for transmitting light through each of said containers;

(d) light sensitive means associated with each of said containers and mounted to receive light from said light means passing through said containers and any material therein;

(e) adjustable electrical circuitry connected to said light sensitive means for altering the threshold thereof according to the light conducting properties of each of said containers and any material contained therein;

(f) agitation means operatively connected to said containers for thoroughly mixing the material to be tested with the antigen in said containers whereby agglutination occurs in certain of said containers wherein specific antibodies present in the material and said antigen reacts;

(g) control means connected to said pump means, said light means and said agitation means for providing proper energization thereof upon the proper actuation of said control means; and (h) indicating means connected to said light sensitive means for indicating a decrease in light passing through any of said containers in which agglutination has occurred.

2. An automatic agglutinometer as set forth in claim 1 wherein the indicating means includes electronic circuitry for differentiating between the threshold signal of each light sensitive means and a lower value of signal caused by agglutination in a container and switching means for sequentially connecting said electronic circuitry to each light sensitive means.

3. An automatic agglutinometer as set forth in claim 1 wherein a plurality of reservoirs are included in said pump means each reservoir being adapted to contain a different antigen and each reservoir having means connected thereto for innoculating a different container with an antigen.

4. An automatic agglutinometer as set forth in claim 1 wherein the indicating means includes comparing circuitry for comparing the amount of light passing through the transparent containers having an antigen therein electrically to the amount of light passing through the transparent containers having an antigen and a sample therein and subsequent to agitation thereof.

5. An automatic agglutinometer as set forth in claim 1 wherein the containers are set in a removable tray and the agitation means includes a motor attached to said tray with means connected between said motor and said tray for applying a rocking motion to said tray and a timer for actuating said motor for a predetermined period of time.

6. An automatic agglutinometer as set forth in claim 5 having in addition means attached to said motor and said tray for actuating said motor after the predetermined period of time is completed and until said tray attains a substantially horizontal position.

References Cited

UNITED STATES PATENTS

| | | | |
|---|---|---|---|
| 2,194,131 | 3/1940 | Terry | 23—230 |
| 2,560,107 | 7/1951 | Hewson | 23—253 |
| 2,653,083 | 9/1953 | Wanzer et al. | 23—253 |
| 2,797,149 | 6/1957 | Skeggs | 23—253 X |
| 3,038,340 | 6/1962 | Isreeli | 73—423 |
| 3,196,449 | 7/1965 | Pelavin et al. | 346—34 |
| 3,266,298 | 8/1966 | Whitehead et al. | 23—253 X |
| 3,269,800 | 8/1966 | Lukrec | 23—253 X |
| 3,334,018 | 8/1967 | Smythe | 23—253 X |
| 3,158,445 | 11/1964 | Huff | 23—230 |

JOSEPH SCOVRONEK, Primary Examiner

ELLIOTT A. KATZ, Assistant Examiner

U.S. Cl. X.R.

23—259; 73—64.1; 356—39, 180